United States Patent
Guo (10) Patent No.: US 9,807,642 B2
(45) Date of Patent: Oct. 31, 2017

(54) TRAFFIC DISTRIBUTION METHOD, DEVICE, AND SYSTEM

(71) Applicant: Huawei Technologies Co., Ltd., Shenzhen, Guangdong (CN)

(72) Inventor: Jianhua Guo, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 168 days.

(21) Appl. No.: 14/748,861

(22) Filed: Jun. 24, 2015

(65) Prior Publication Data

US 2015/0296406 A1    Oct. 15, 2015

Related U.S. Application Data (63) Continuation of application No. PCT/CN2012/087888, filed on Dec. 28, 2012.

(51) Int. Cl.
H04W 28/02 (2009.01)
H04L 29/08 (2006.01)
(Continued)

(52) U.S. Cl.
CPC ..... *H04W 28/0273* (2013.01); *H04L 12/6418* (2013.01); *H04L 29/08* (2013.01); *H04L 43/026* (2013.01); *H04L 69/30* (2013.01); *H04L 43/028* (2013.01); *H04W 28/12* (2013.01); *H04W 80/12* (2013.01)

(58) Field of Classification Search
None
See application file for complete search history.

(56) References Cited

U.S. PATENT DOCUMENTS

2005/0021715 A1    1/2005   Dugatkin et al.
2007/0058632 A1*   3/2007   Back .................. H04L 43/00
                                                  370/392
(Continued)

FOREIGN PATENT DOCUMENTS

CN    1592248 A    3/2005
CN    1738257 A    2/2006
(Continued)

OTHER PUBLICATIONS

Toshio Soumiya et al., "A Study of Network Information Extraction using Deep Packet Inspection", IEICE Technical Report, vol. 111, No. 196, Aug. 25, 2011, p. 17-22.
(Continued)

*Primary Examiner* — Candal Elpenord (57) ABSTRACT

The present invention relates to a traffic distribution method, apparatus, and system. The method includes: receiving a current packet sent by a first entity; acquiring layer 7 application information according to the current packet; if the layer 7 application information is acquired, matching the current packet with a layer 7 traffic distribution policy according to the layer 7 application information; and sending the current packet to a service server after the current packet matches the layer 7 traffic distribution policy. In this way, the present invention implements traffic distribution based on the layer 7 application information, enhances performance of a traffic distribution device, and reduces deployment costs of an operator.

14 Claims, 3 Drawing Sheets

(51) Int. Cl.
*H04L 12/64* (2006.01)
*H04L 12/26* (2006.01)
*H04W 28/12* (2009.01)
*H04W 80/12* (2009.01)

(56) References Cited

U.S. PATENT DOCUMENTS

| | | | |
|---|---|---|---|
| 2008/0177896 A1* | 7/2008 | Quinn | G06F 9/5055 709/238 |
| 2010/0095367 A1* | 4/2010 | Narayanaswamy | H04L 63/0245 726/12 |
| 2010/0132031 A1* | 5/2010 | Zheng | H04L 63/0227 726/13 |
| 2011/0051614 A1* | 3/2011 | Li | H04L 63/0245 370/252 |
| 2011/0231649 A1 | 9/2011 | Bollay et al. | |
| 2012/0027015 A1 | 2/2012 | Carney et al. | |
| 2012/0093160 A1 | 4/2012 | Toensing et al. | |

FOREIGN PATENT DOCUMENTS

| | | |
|---|---|---|
| CN | 1287570 C | 11/2006 |
| CN | 101039328 A | 9/2007 |
| CN | 101305561 A | 11/2008 |
| CN | 101350781 A | 1/2009 |
| CN | 101599895 A | 12/2009 |
| CN | 101753622 A | 6/2010 |
| EP | 1 480 379 A1 | 11/2004 |
| WO | WO 2007/023467 A2 | 3/2007 |

OTHER PUBLICATIONS

Yoshiteru Takeshima et al., "An Implementation and Evaluation of Service-Enhancing Web Proxy Server", Technical Report of IEICE, vol. 102, No. 444, Nov. 7, 2002, p. 25-30.

* cited by examiner

“TRAFFIC DISTRIBUTION METHOD, DEVICE, AND SYSTEM”

CROSS-REFERENCE TO RELATED APPLICATIONS

This application is a continuation of International Application No. PCT/CN2012/087888, filed on Dec. 28, 2012, which is hereby incorporated by reference in its entirety.

TECHNICAL FIELD

The present invention relates to the communications field, and in particular, to a traffic distribution method, device, and system.

BACKGROUND

With development of communications technologies, a large number of gateway devices exist on the mobile Internet and the Internet. As a network continues to change and user service requirements increase, a gateway on the network not only needs to complete traditional gateway functions such as protocol conversion, but also needs to support processing on some non-traditional gateway services, such as classification and filtering based on a uniform resource locator (Uniform Resource Locator, URL), reports, website Web optimization, cache memory Cache acceleration, and other services. Some of these services are completed by an external service server of the gateway. When processing on various non-traditional gateway services needs to be completed by the external service server, the gateway on the network needs to support a traffic distribution function and be capable of distributing traffic to the external service server.

Generally, a traffic distribution method adopted by the gateway is as follows: Received traffic is matched based on routing or policy-based routing, and if the matching succeeds, the traffic is then distributed to the external service server, and the service server completes service processing.

However, the foregoing traffic distribution method supports only port-based traffic distribution, and this method is inaccurate with false determination and missed determination and therefore cannot satisfy application-based traffic distribution. In addition, this traffic distribution method may cause a large amount of traffic that does not need to be processed to be distributed to the external service server. As a result, the external service server needs to forward and process the traffic that does not need to be processed, thereby resulting in a waste of overall system resources and increasing device investments of an operator.

SUMMARY

The present invention provides a traffic distribution method, device, and system, which solve the problem that a traffic distribution method in the prior art supports only port-based traffic distribution and the method is inaccurate with false positives and false negatives, enhance performance of a traffic distribution device and reduce deployment costs of an operator.

In a first aspect, the present invention provides a traffic distribution method, where the method includes: receiving a current packet sent by a first entity; acquiring layer 7 application information according to the current packet; if the layer 7 application information is acquired, matching the current packet with a layer 7 traffic distribution policy according to the layer 7 application information; and sending the current packet to a service server corresponding to the layer 7 traffic distribution policy after the current packet matches the layer 7 traffic distribution policy. The acquiring layer 7 application information according to the current packet specifically includes: performing deep packet inspection DPI processing on the current packet to acquire the layer 7 application information used for layer 7 traffic distribution.

In a first possible implementation manner of the first aspect, the method further includes: if the layer 7 application information is not acquired, processing the current packet, sending the current packet to a second entity, and buffering the current packet, where the buffered packet becomes a historical packet.

With reference to the first aspect and the first possible implementation manner of the first aspect, in a second possible implementation manner, after the current packet matches the layer 7 traffic distribution policy, the method further includes: if a historical packet is buffered before the current packet, sending the historical packet buffered before the current packet to a service server corresponding to the layer 7 traffic distribution policy, so that the service server processes the historical packet and sends the processed historical packet to a traffic distribution device or discards the processed historical packet.

With reference to the first aspect or the first possible implementation manner of the first aspect, in a third possible implementation manner, after the sending the current packet to a service server after the current packet matches the layer 7 traffic distribution policy, the method further includes: receiving the processed current packet returned by the service server, and sending the processed current packet to the second entity.

With reference to the first aspect or the first possible implementation manner of the first aspect, in a fourth possible implementation manner, after the sending the current packet to a service server after the current packet matches the layer 7 traffic distribution policy, the method further includes: receiving the processed current packet and the processed historical packet that are returned by the service server, sending the processed current packet to the second entity, and discarding the processed historical packet.

In a second aspect, the present invention provides a traffic distribution device, where the device includes: a receiver, configured to receive a current packet sent by a first entity and transmit the current packet to a processor; the processor, configured to receive the current packet from the receiver, acquire layer 7 application information according to the current packet, and if the layer 7 application information is acquired, match the current packet with a layer 7 traffic distribution policy according to the layer 7 application information; and a traffic distributor, configured to send the current packet to a service server after the current packet matches the layer 7 traffic distribution policy. The processor is configured to perform deep packet inspection DPI processing on the current packet to acquire the layer 7 application information used for layer 7 traffic distribution.

Ina first possible implementation manner of the second aspect, the device includes: a buffer, configured to, if the layer 7 application information is not acquired, send the current packet to a second entity, and buffer the current packet, where the buffered packet becomes a historical packet.

With reference to the second aspect and the first possible implementation manner of the second aspect, in a second possible implementation manner, the traffic distributor is further configured to, if a historical packet is buffered before the current packet, send the historical packet buffered before the current packet to a service server corresponding to the layer 7 traffic distribution policy, so that the service server processes the historical packet and sends the processed historical packet to the traffic distribution device or discards the processed historical packet.

With reference to the second aspect or the first possible implementation manner of the second aspect, in a third possible implementation manner, the receiver is further configured to receive the processed current packet returned by the service server, and send the processed current packet to the second entity.

With reference to the second aspect or the first possible implementation manner of the second aspect, in a fourth possible implementation manner, the receiver is further configured to receive the processed current packet and the processed historical packet that are returned by the service server, send the processed current packet to the second entity, and discard the processed historical packet.

In a third aspect, the present invention provides a traffic distribution device, where the device includes a network interface, a processor, a memory, and an application program physically stored in the memory, where the application program includes instructions that may be used to instruct the processor and the device to perform the following procedures: receiving a current packet sent by a first entity; acquiring layer 7 application information according to the current packet; if the layer 7 application information is acquired, matching the current packet with a layer 7 traffic distribution policy according to the layer 7 application information; and sending the current packet to a service server after the current packet matches the layer 7 traffic distribution policy. The instruction that is included in the application program and may be used to instruct the processor and the device to perform the procedure of acquiring layer 7 application information according to the current packet further includes: performing deep packet inspection DPI processing on the current packet to acquire the layer 7 application information used for layer 7 traffic distribution.

In a first possible implementation manner of the third aspect, the application program further includes an instruction that may be used to instruct the processor and the device to perform the following procedure after the procedure of acquiring layer 7 application information according to the current packet is performed: if the layer 7 application information is not acquired, processing the current packet, sending the current packet to a second entity, and buffering the current packet, where the buffered packet becomes a historical packet.

With reference to the third aspect and the first possible implementation manner of the third aspect, in a second possible implementation manner, the application program further includes an instruction that may be used to instruct the processor and the device to perform the following procedure after the current packet matches the layer 7 traffic distribution policy: if a historical packet is buffered before the current packet, sending the historical packet buffered before the current packet to a service server corresponding to the layer 7 traffic distribution policy, so that the service server processes the historical packet and sends the processed historical packet to the traffic distribution device or discards the processed historical packet.

With reference to the third aspect or the first possible implementation manner of the third aspect, in a third possible implementation manner, the application further includes an instruction that may be used to instruct the processor and the device to perform the following procedure after the procedure of sending the current packet to a service server after the current packet matches the layer 7 traffic distribution policy is performed: receiving the processed current packet returned by the service server, and sending the processed current packet to the second entity.

With reference to the third aspect or the first possible implementation manner of the third aspect, in a fourth possible implementation manner, the application further includes an instruction that may be used to instruct the processor and the device to perform the following procedure after the procedure of sending the current packet to a service server after the current packet matches the layer 7 traffic distribution policy is performed: receiving the processed current packet and the processed historical packet that are returned by the service server, sending the processed current packet to the second entity, and discarding the processed historical packet.

In a fourth aspect, the present invention provides a traffic distribution system, where the system includes: the traffic distribution device described in the second aspect, a first entity, a second entity, and a service server; or the traffic distribution device described in the third aspect, a first entity, a second entity, and a service server.

According to the traffic distribution method, device, and system that are provided in the foregoing, a current packet sent by a first entity is received; layer 7 application information used for layer 7 traffic distribution is acquired; if the layer 7 application information is not acquired, the current packet is buffered, where the buffered packet becomes a historical packet; if the layer 7 application information is acquired, matching the current packet with a layer 7 traffic distribution policy is performed according to the layer 7 application information; and if the current packet matches the layer 7 traffic distribution policy, the current packet is distributed to a service server, thereby implementing traffic distribution based on the layer 7 application information, enhancing performance of a traffic distribution device, and reducing deployment costs of an operator.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

According to a traffic distribution method, device, and system that are provided in embodiments of the present invention, a current packet sent by a first entity is received, and deep packet inspection DPI processing is performed on the current packet to acquire layer 7 application information used for layer 7 traffic distribution; if the layer 7 application information is not acquired, the current packet is buffered, where the buffered packet becomes a historical packet; if the layer 7 application information is acquired, matching the current packet with a layer 7 traffic distribution policy is performed according to the layer 7 application information; and, if the current packet matches the layer 7 traffic distribution policy, a historical packet buffered before the current packet is replayed onto a service server corresponding to the layer 7 traffic distribution policy, and the current packet is also distributed to the service server, where the historical packet includes all packets or some packets that are buffered before a traffic distribution device receives the current packet, and replay of the historical packet achieves an objective of transmitting other information before the current packet to the service server, and ensures service connectivity, thereby implementing traffic distribution based on the layer 7 application information, enhancing performance of the traffic distribution device, and reducing deployment costs of an operator.

In addition, specific meanings of terms involved in all the embodiments of the present invention are as follows:

Layer 7 application information in the present invention refers to content borne based on an application protocol such as the Hypertext Transport Protocol (hypertext transport protocol, HTTP), the file transfer protocol (File Transfer Protocol, FTP), the simple mail transfer protocol (Simple Mail Transfer Protocol, SMTP), the real time streaming protocol (Real Time Streaming Protocol, RTSP), and the post office protocol-version 3 (Post Office Protocol-Version 3, POP3). The layer 7 application information may also be referred to as layer 7 application information or Layer 7 application information.

A layer 7 traffic distribution policy in the present invention refers to a traffic distribution policy based on the layer 7 application information, for example, correspondence between the layer 7 application information and a server.

Traffic distribution in the present invention refers to distributing traffic to different external servers based on a given policy.

Replay (Replay) in the present invention refers to sending a packet that has been received by a destination server to a third-party service server.

A service server in the present invention refers to a device completing various services, including but not limited to web page (Web) acceleration, video (Video) acceleration, antivirus, URL filtering, anti-attack, advertisement insertion, data compression, and Web adaptation.

Figure 1:
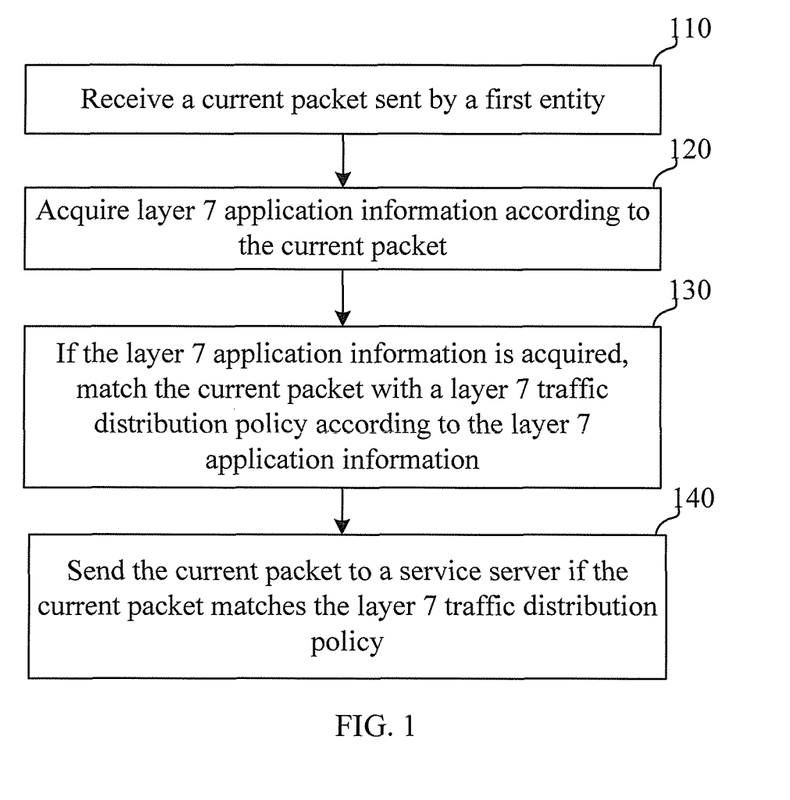
FIG. 1 is a flowchart of a traffic distribution method according to a first embodiment of the present invention.

FIG. 1 is a flowchart of a traffic distribution method according to a first embodiment of the present invention. As shown in the figure, the embodiment of the present invention specifically includes the following steps:

Step 110: A traffic distribution device receives a current packet sent by a first entity.

Specifically, the traffic distribution device may be a gateway and may also be another network device supporting traffic distribution. If it is a gateway, the gateway (Gateway) device includes various gateway devices, such as a gateway general packet radio service support node (Gateway General Packet Radio Service Support Node, GGSN) and a packet data serving node (Packet Data Serving Node, PDSN) on a 3rd-generation (3rd-generation, 3G) 3G network, and may also include a related gateway device applied on a fixed network, for example, a broadband access server (Broadband Remote Access Server, BRAS); and, the gateway may also be a packet switch gateway (Packet Switch Gateway, PSGW), and the PSGW is a P-GW and a S-GW in long term evolution (Long Term Evolution, LTE). The first entity refers to an entity performing communication through the traffic distribution device, and the entity may be a user, a user equipment, or application software.

Step 120: The traffic distribution device acquires layer 7 application information according to the current packet, where the layer 7 application information is used for layer 7 traffic distribution.

Specifically, there are many methods for acquiring the layer 7 application information used for the layer 7 traffic distribution, for example, performing deep packet inspection (Deep Packet Inspection, DPI) processing on the current packet. The DPI technology is a technology of traffic inspection and control based on an application layer. Herein, only use of the DPI processing technology is described. However, a method for acquiring the layer 7 application information is not limited to this processing method, and a method can be used as long as the layer 7 application information can be acquired, which is not detailed herein.

Step 130: If the traffic distribution device acquires the layer 7 application information, it matches the current packet with a layer 7 traffic distribution policy according to the layer 7 application information, where the traffic distribution policy is preconfigured in the traffic distribution device.

Specifically, during the matching of the current packet with a layer 7 traffic distribution policy performed by the traffic distribution device, for example, for the HTTP protocol, when a certain URL is matched, the flow is distributed to service server A; for the HTTP protocol, when the content is text, the flow is distributed to service server B; and for the FTP protocol, when a type of a requested file is video, the flow is distributed to service server C.

Further, step 130 further includes: if the traffic distribution device does not acquire the layer 7 application information, sending the current packet to a second entity, and buffering the current packet, where the buffered packet becomes a historical packet. Like the first entity, the second entity refers to an entity performing communication through the traffic distribution device, and the entity may be a user, a user equipment, or application software.

Further, the buffering the current packet if the traffic distribution device does not acquire the layer 7 application information in step 130, where the buffered packet becomes a historical packet, further includes: if the layer 7 application information is not acquired after DPI processing has been performed on a preset number of continuous packets before the current packet is received, and the layer 7 application information is also not acquired after DPI processing is performed on the current packet, clearing the preset number of continuous packets that are buffered, and canceling traffic distribution performed on a data flow to which the current packet belongs, where the preset number is set by a user for a purpose of avoiding continuous DPI processing performed on the data flow to which the current packet belongs.

Further, after the traffic distribution device matches the current packet with a layer 7 traffic distribution policy according to the layer 7 application information in step 130, the method further includes: when the current packet does not match the layer 7 traffic distribution policy, sending the packet to the second entity, clearing all packets, where the packets have been buffered before the traffic distribution device receives the current packet, and canceling the traffic distribution performed on the data flow to which the current packet belongs.

Step 140: Send the current packet to a service server after the current packet matches the layer 7 traffic distribution policy.

Step 140 further includes: if a historical packet is buffered before the current packet, sending the historical packet buffered before the current packet to the service server corresponding to the layer 7 traffic distribution policy. All historical packets buffered before the current packet may be sent to the service server corresponding to the layer 7 traffic distribution policy; or some historical packets buffered before the current packet may be sent to the service server corresponding to the layer 7 traffic distribution policy.

In addition, in step 140, a historical packet buffered before the current packet may also be replayed onto the service server corresponding to the layer 7 traffic distribution policy, and then the current packet is distributed to the service server corresponding to the layer 7 traffic distribution policy.

Specifically, the service server is an external service server to which the traffic distribution device distributes traffic. The service server may support processing on some non-traditional gateway services. Processing performed by the service server on the current packet received and the replayed packet received includes the following: 1) Complete service processing such as web page (Web) acceleration, video (Video) acceleration, antivirus, URL filtering, anti-attack, advertisement insertion, data compression, and Web adaptation, which are functions of the service server; 2) process the replayed packet sent by the gateway, including receiving the replayed packet and acquiring information, such as an MSS of TCP and a TCP option, from the replayed packet.

Further, after step 140, the following is further included: The traffic distribution device receives the processed current packet returned by the service server, and sends the processed current packet to the second entity.

Specifically, in this step, for a replayed historical packet received, the service server adopts a processing manner of not returning it to the traffic distribution device, but for the current packet received, the service server adopts a processing manner of processing the current packet and returning the processed current packet to the traffic distribution device.

Further, after step 140, the following is further included: The traffic distribution device receives the processed current packet and the processed historical packet that are returned by the service server, sends the processed current packet to the second entity, and discards the processed historical packet. The processed current packet is a packet that is returned by the service server after the service server processes the current packet.

Specifically, in this step, for the replayed historical packet received, the service server adopts a processing manner of returning it to the traffic distribution device, where the traffic distribution device directly discards the historical packet after receiving the returned historical packet; and for the current packet received, the service server processes the current packet and returns the processed current packet to the traffic distribution device, where the traffic distribution device sends the processed current packet to the second entity.

Figure 2:
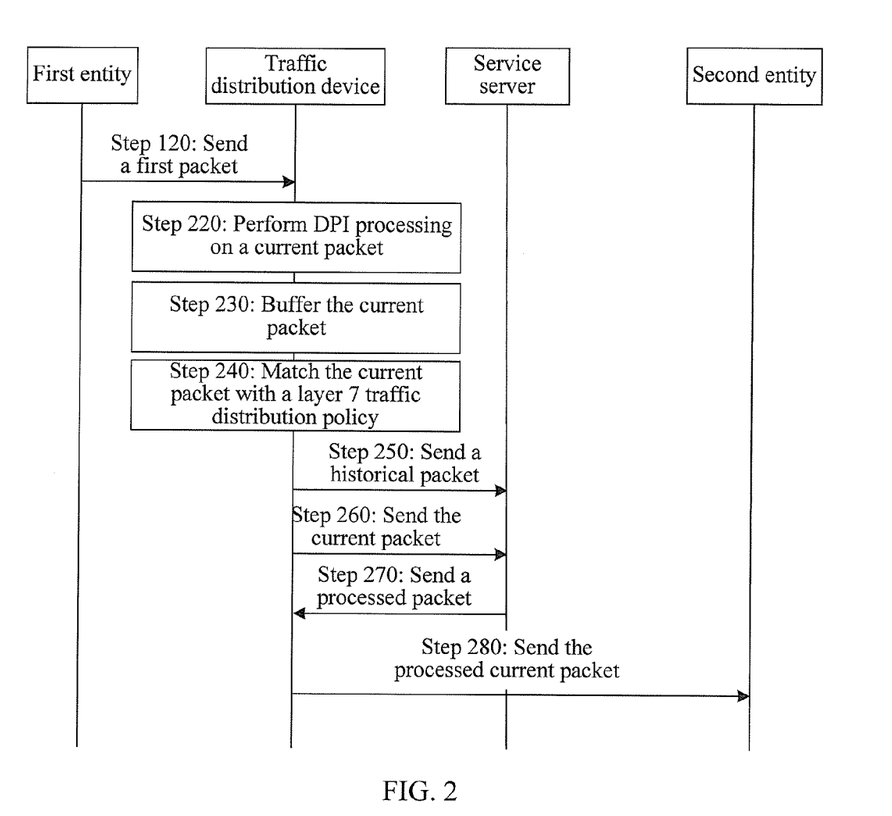
FIG. 2 is an information exchange diagram of a traffic distribution method according to a second embodiment of the present invention.

FIG. 2 is a flowchart of a traffic distribution method according to a second embodiment of the present invention. This embodiment includes a first entity, a second entity, a gateway, and a service server. The first entity and the second entity refer to two entities communicating through the gateway in general, that is, two parties in communication, such as mobile phones, computers, notebook computers, or wireless application protocol (Wireless Application Protocol, WAP) servers. As shown in the figure, the embodiment of the present invention specifically includes the following steps:

Step 210: The first entity sends a current packet to a traffic distribution device, where the current packet is a packet that needs to be sent by the first entity to the second entity through the gateway.

Step 220: The traffic distribution device performs deep packet inspection DPI processing on the current packet, where the DPI processing aims to acquire layer 7 application information used for layer 7 traffic distribution. If the traffic distribution device does not acquire the layer 7 application information, step 230 is performed; and if the traffic distributed device acquires the layer 7 application information, step 240 is performed.

Step 230: If the traffic distribution device does not acquire the layer 7 application information, the traffic distribution device buffers the current packet, processes the current packet, and sends the processed current packet to the second entity, that is, step 280 is performed.

Specifically, if the layer 7 application information is not acquired after the traffic distribution device buffers a preset number of continuous current packets, that is, after the traffic distribution device performs deep packet inspection DPI processing on the preset number of continuous current packets, the preset number of continuous current packets that are buffered are cleared, and traffic distribution on a data flow to which the current packet belongs is canceled. The preset number is set by a user for a purpose of avoiding continuous DPI processing performed on the data flow to which the current packet belongs.

Step 240: The traffic distribution device matches the current packet with a layer 7 traffic distribution policy according to the layer 7 application information. If the traffic distribution device can match the current packet with a layer 7 traffic distribution policy, step 250 is performed, and then step 260 is performed; and if the traffic distribution device cannot match the current packet with a layer 7 traffic distribution policy, step 280 is performed, and meanwhile, all packets that are buffered before the current packet are received by the traffic distribution device are cleared, and the traffic distribution on the data flow to which the current packet belongs is canceled.

Step 250: The traffic distribution device sends a historical packet to the service server.

Specifically, the traffic distribution device replays all historical packets to the service server or replays some historical packets to the service server.

Step 260: The traffic distribution device distributes the current packet to the service server.

Step 270: The service server processes the received packets and returns the processed packets to the traffic distribution device, where the packets received by the service server include the current packet and the historical packet.

Specifically, for the replayed historical packet received, the service server may choose to process the historical packet and then return the processed historical packet to the traffic distribution device, and may also choose to directly discard the processed historical packet instead of returning the processed historical packet to the traffic distribution device. If the service server chooses to return the processed historical packet to the traffic distribution device, the traffic distribution device discards the processed historical packet after receiving the processed historical packet. However, for the current packet received, the service server processes the current packet and returns the processed packet to the traffic distribution device, and then step 280 is performed. Processing performed by the service server on the current packet received and the replayed packet received includes the following: 1) Complete service processing such as web page (Web) acceleration, video (Video) acceleration, antivirus, URL filtering, anti-attack, advertisement insertion, data compression, and Web adaptation, which are functions of the service server; 2) process the replayed packet sent by the gateway, including receiving the replayed packet and acquiring information, such as an MSS of TCP and a TCP option, from the replayed packet.

In another embodiment, the packet received by the service server in step 270 may also include only the current packet but no historical packet. This indicates that the traffic distribution device does not have a buffered historical packet before receiving the current packet.

Step 280: The traffic distribution device sends the processed current packet to the second entity.

In the traffic distribution methods provided in the first embodiment and the second embodiment of the present invention, the first entity sends a current packet of the first entity to the second entity through the traffic distribution device, where the first entity is an initiating end of the current packet, and the second entity is a receiving end of the processed current packet.

In addition, when the second entity sends a current packet of the second entity to the first entity, the second entity is an initiating end of the current packet, and the first entity is a receiving end of the processed current packet. The remaining process is the same as the process of the foregoing traffic distribution method, and therefore no further details are provided herein.

Therefore, according to the traffic distribution method provided in the embodiment of the present invention, a current packet sent by a first entity is received, and deep packet inspection DPI is performed on the current packet to acquire layer 7 application information used for layer 7 traffic distribution; if the layer 7 application information is not acquired, the current packet is buffered; if the layer 7 application information is acquired, the current packet is matched with a layer 7 traffic distribution policy according to the layer 7 application information; when the current packet matches the layer 7 traffic distribution policy, a historical packet is replayed to a service server, and then the current packet is distributed to the service server, where the historical packet includes all packets or some packets that are buffered before a traffic distribution device receives the current packet, thereby implementing traffic distribution based on the layer 7 application information, enhancing performance of the traffic distribution device, and reducing deployment costs of an operator.

Figure 3:
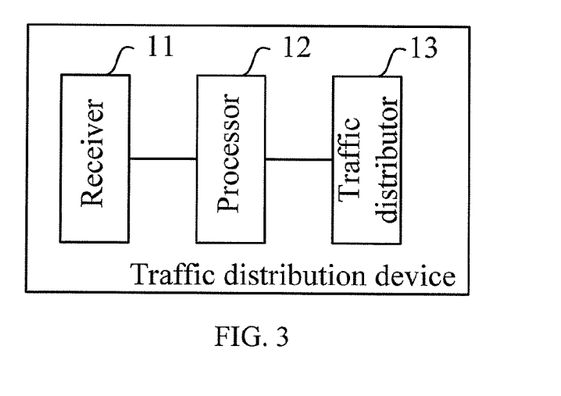
FIG. 3 is a schematic diagram of a traffic distribution device according to a third embodiment of the present invention.

FIG. 3 is a schematic diagram of a traffic distribution device according to a third embodiment of the present invention. The traffic distribution device is configured to perform the traffic distribution methods provided in the first embodiment and the second embodiment of the present invention. As shown in the figure, the embodiment of the present invention specifically includes: a receiver 11, a processor 12, and a traffic distributor 13.

The receiver 11 is configured to receive a current packet sent by a first entity and transmit the current packet to the processor 12; the processor 12 is configured to receive the current packet from the receiver 11, acquire layer 7 application information according to the current packet, and if the layer 7 application information is acquired, match the current packet with a layer 7 traffic distribution policy according to the layer 7 application information, obtain a matching result, and transmit the matching result to the traffic distributor 13; and, the traffic distributor 13 is configured to receive the matching result from the processor 12, and send the current packet to a service server When the matching result is that the current packet can match the layer 7 traffic distribution policy. The processor 12 is configured to perform deep packet inspection DPI processing on the current packet to acquire the layer 7 application information used for layer 7 traffic distribution.

Further, the traffic distribution device provided in the embodiment of the present invention further includes a buffer.

The buffer is configured to, if the layer 7 application information is not acquired, process the current packet, send the current packet to a second entity, and buffer the current packet, where the buffered packet becomes a historical packet.

In an embodiment, the traffic distributor 13 is further configured to, if a historical packet is buffered before the current packet, send the historical packet buffered before the current packet to a service server corresponding to the layer 7 traffic distribution policy. All historical packets buffered before the current packet may be sent to the service server corresponding to the layer 7 traffic distribution policy, or some historical packets buffered before the current packet may be sent to the service server corresponding to the layer 7 traffic distribution policy, so that the service server processes the historical packet and sends the processed historical packet to the traffic distribution device or discards the processed historical packet.

In another embodiment, the receiver 11 is further configured to receive the processed current packet returned by the service server, and send the processed current packet to the second entity. Alternatively, the receiver is further configured to receive the processed current packet and the processed historical packet that are returned by the service server, send the processed current packet to the second entity, and discard the processed historical packet.

In still another embodiment, the buffer is further configured to, if the layer 7 application information is not acquired after DPI processing has been performed on a preset number of continuous packets before the current packet is received, and the layer 7 application information is also not acquired after DPI processing is performed on the current packet, clear the preset number of continuous packets that are buffered, and cancel traffic distribution on a data flow to which the current packet belongs.

Further, after the current packet is matched with a layer 7 traffic distribution policy according to the layer 7 application information, the traffic distributor 13 is further configured to: when the current packet does not match the layer 7 traffic distribution policy, process the current packet and then send it to the second entity, clear all packets, where the packets have been buffered before the traffic distribution device receives the current packet, and cancel the traffic distribution on the data flow to which the current packet belongs.

The first entity in the embodiment of the present invention includes a mobile phone, a computer, a notebook computer, or a WAP server; the second entity includes a mobile phone, a computer, a notebook computer, or a WAP server; and the first entity and the second entity are two entities communicating through the traffic distribution device.

Therefore, the traffic distribution device provided in the embodiment of the present invention receives a current packet sent by a first entity, and performs deep packet inspection DPI processing on the current packet to acquire layer 7 application information used for layer 7 traffic distribution; if the layer 7 application information is not acquired, buffers the current packet; if the layer 7 application information is acquired, matches the current packet with a layer 7 traffic distribution policy according to the layer 7 application information; and, when the current packet matches the layer 7 traffic distribution policy, replays a historical packet to a service server, and then distributes the current packet to the service server, where the historical packet includes all packets or some packets that are buffered before the traffic distribution device receives the current packet, thereby implementing traffic distribution based on the layer 7 application information, enhancing performance of the traffic distribution device, and reducing deployment costs of an operator.

Figure 4:
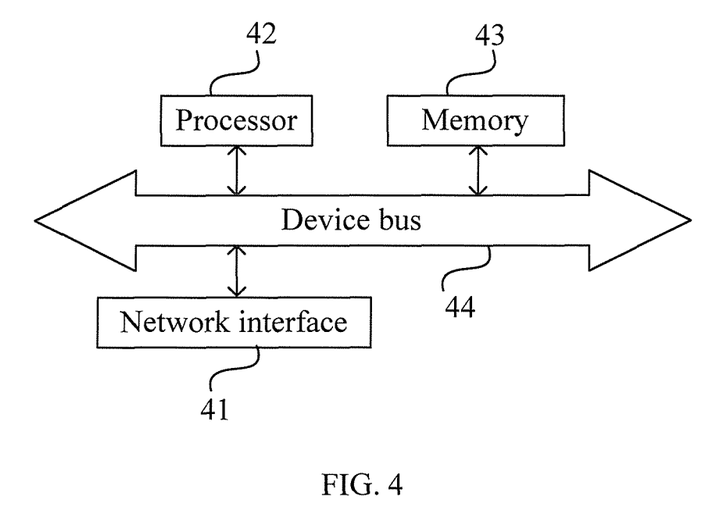
FIG. 4 is a schematic diagram of a traffic distribution device according to a fourth embodiment of the present invention.

FIG. 4 is a schematic diagram of a traffic distribution device according to a fourth embodiment of the present invention. The traffic distribution device is configured to perform the traffic distribution methods provided in the first embodiment and the second embodiment of the present invention. As shown in the figure, the embodiment of the present invention specifically includes: a network interface 41, a processor 42, and a memory 43. A device bus 44 is configured to connect the network interface 41, the processor 42, and the memory 43.

The network interface 41 is configured to connect a first entity, a second entity, and multiple external service servers.

The memory 43 may be a permanent memory, for example, a hard disk driver and a flash memory, and the memory 43 has a software module and a device driver. The software module various functional modules that are capable of executing the foregoing method in the present invention, and the device driver may be a network driver and an interface driver.

An application program is physically stored in the memory 43, where the application program includes instructions that may be used to instruct the processor 42 and the device to perform the following procedures:

receiving a current packet sent by a first entity; acquiring layer 7 application information according to the current packet, where deep packet inspection DPI processing is performed on the current packet to acquire the layer 7 application information used for layer 7 traffic distribution;

if the layer 7 application information is acquired, matching the current packet with a layer 7 traffic distribution policy according to the layer 7 application information; and sending the current packet to a service server after the current packet matches the layer 7 traffic distribution policy.

Further, after the processor accesses the software module of the memory 43, the application program further includes an instruction that may be used to instruct the processor and the device to perform the following procedure after the procedure of acquiring layer 7 application information according to the current packet is performed: if the layer 7 application information is not acquired, processing the current packet, sending the current packet to the second entity, and buffering the current packet, where the buffered packet becomes a historical packet.

In an embodiment, the application program further includes an instruction that may be used to instruct the processor and the device to perform the following procedure after the current packet matches the layer 7 traffic distribution policy: if a historical packet is buffered before the current packet, sending the historical packet buffered before the current packet to a service server corresponding to the layer 7 traffic distribution policy. All historical packets buffered before the current packet may be sent to the service server corresponding to the layer 7 traffic distribution policy, or some historical packets buffered before the current packet may be sent to the service server corresponding to the layer 7 traffic distribution policy, so that the service server processes the historical packet and sends the processed historical packet to the traffic distribution device or discards the processed historical packet.

In another embodiment, the application further includes an instruction that may be used to instruct the processor and the device to perform the following procedure after the procedure of sending the current packet to a service server after the current packet matches the layer 7 traffic distribution policy is performed: receiving the processed current packet returned by the service server, and sending the processed current packet to the second entity; or receiving the processed current packet and the processed historical packet that are returned by the service server, sending the processed current packet to the second entity, and discarding the processed historical packet.

In still another embodiment, the instruction in the application program and may be used to instruct the processor and the device to perform the procedure of, if the layer 7 application information is not acquired, sending the current packet to the second entity and buffering the current packet, where the buffered packet becomes a historical packet further includes: if the layer 7 application information is not acquired after DPI processing has been performed on a preset number of continuous packets before the current packet is received, and the layer 7 application information is also not acquired after DPI processing is performed on the current packet, clearing the preset number of continuous packets that are buffered, and canceling traffic distribution on a data flow to which the current packet belongs.

Further, the application further includes an instruction that may be used to instruct the processor and the device to perform the following procedure after the procedure of matching the current packet with a layer 7 traffic distribution policy according to the layer 7 application information is performed: when the current packet does not match the layer 7 traffic distribution policy, processing the current packet, sending the processed current packet to the second entity, clearing all packets, where the packets have been buffered before the traffic distribution device receives the current packet, and canceling the traffic distribution on the data flow to which the current packet belongs.

The first entity in the embodiment of the present invention includes a mobile phone, a computer, a notebook computer, or a WAP server; the second entity includes a mobile phone, a computer, a notebook computer, or a WAP server; and the first entity and the second entity are two entities communicating through the traffic distribution device.

Therefore, the traffic distribution device provided in the embodiment of the present invention receives a current packet sent by a first entity, and performs deep packet inspection DPI processing on the current packet to acquire layer 7 application information used for layer 7 traffic distribution; if the layer 7 application information is not acquired, buffers the current packet; if the layer 7 application information is acquired, matches the current packet with a layer 7 traffic distribution policy according to the layer 7 application information; and, when the current packet matches the layer 7 traffic distribution policy, replays a historical packet to a service server, and then distributes the current packet to the service server, where the historical packet includes all packets or some packets that are buffered before the traffic distribution device receives the current packet, thereby implementing traffic distribution based on the layer 7 application information, enhancing performance of the traffic distribution device, and reducing deployment costs of an operator.

An embodiment of the present invention further provides a traffic distribution system. The system includes the traffic distribution device provided in the third or fourth embodiment of the present invention, a first entity, a second entity, and a service server. There is at least one service server, and there may also be multiple service servers. For example, for the HTTP protocol, when a certain URL is matched, the traffic distribution device distributes a packet sent by the first entity, that is, the flow, to service server A; for the HTTP protocol, when its content is text, the traffic distribution device distributes a packet sent by the first entity, that is, the flow, to service server B; and for the FTP protocol, when a type of a requested file is video, the traffic distribution device distributes a packet sent by the first entity, that is, the flow, to service server C.

A person skilled in the art should be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solution. A person skilled in the art may use different methods to implement the described functions for each particular application, but it should not be considered that the implementation goes beyond the scope of the present invention.

The steps of the methods or algorithms described in combination with the embodiments disclosed in the specification may be implemented using hardware, a software module executed by a processor, or the combination thereof. The software module may be placed in a random access memory (RAM), a memory, a read-only memory (ROM), an electrically programmable ROM, an electrically erasable programmable ROM, a register, a hard disk, a removable magnetic disk, a CD-ROM, or a storage medium of any other form well-known in the technical field.

In the foregoing specific embodiments, the objectives, technical solutions, and beneficial effects of the present invention are further described in detail. It should be understood that the foregoing descriptions are merely specific embodiments of the present invention, but are not intended to limit the protection scope of the present invention. All modifications, equivalent replacements, improvements or the like made within the spirit and principle of the present invention shall fall within the protection scope of the present invention.

What is claimed is:

1. A traffic distribution method, comprising:
receiving a current packet sent by a first entity;
acquiring layer 7 application information according to the current packet;
when the layer 7 application information is not acquired, processing the current packet, sending the current packet to a second entity, and buffering the current packet, wherein the buffered packet becomes a historical packet;
when the layer 7 application information is acquired, matching the current packet with a layer 7 traffic distribution policy according to the layer 7 application information;
sending the current packet to a service server corresponding to the layer 7 traffic distribution policy after the current packet matches the layer 7 traffic distribution policy; and
when the current packet does not match the layer 7 traffic distribution policy, processing the current packet, sending the processed current packet to the second entity, clearing all historical packets, where the historical packets have been buffered before the traffic distribution device receives the current packet, and canceling the traffic distribution on a data flow to which the current packet belongs.

2. The traffic distribution method according to claim 1, wherein acquiring layer 7 application information according to the current packet comprises:
performing deep packet inspection (DPI) processing on the current packet to acquire the layer 7 application information used for layer 7 traffic distribution.

3. The traffic distribution method according to claim 1, wherein after the current packet matches the layer 7 traffic distribution policy, the method further comprises:
when a historical packet is buffered before the current packet, sending the historical packet buffered before the current packet to a service server corresponding to the layer 7 traffic distribution policy, so that the service server processes the historical packet and sends the processed historical packet to a traffic distribution device or discards the processed historical packet.

4. The traffic distribution method according to claim 1, wherein after sending the current packet to the service server after the current packet matches the layer 7 traffic distribution policy, the method further comprises:
receiving the processed current packet returned by the service server, and sending the processed current packet to the second entity.

5. The traffic distribution method according to claim 1, wherein after sending the current packet to the service server after the current packet matches the layer 7 traffic distribution policy, the method further comprises:
receiving the processed current packet and a processed historical packet that are returned by the service server, sending the processed current packet to the second entity, and discarding the processed historical packet.

6. The traffic distribution method according to claim 1, wherein processing the current packet, sending the current packet to the second entity, and buffering the current packet comprises:
when the layer 7 application information is not acquired before the current packet is received and after deep packet inspection (DPI) processing is performed on a preset number of continuous packets, and the layer 7 application information is also not acquired after DPI processing is performed on the current packet, clearing the preset number of continuous packets that are buffered, and canceling traffic distribution on a data flow to which the current packet belongs.

7. The traffic distribution method according to claim 1, wherein:
the first entity comprises a mobile phone, a computer, a notebook computer, or a wireless application protocol (WAP) server;
the second entity comprises a mobile phone, a computer, a notebook computer, or a WAP server; and the first entity and the second entity are two entities communicating through the traffic distribution device.

8. A traffic distribution device, comprising:
a receiver, configured to receive a current packet sent by a first entity and transmit the current packet;
a processor configured to receive the current packet, acquire layer 7 application information according to the current packet, and when the layer 7 application information is acquired, match the current packet with a layer 7 traffic distribution policy according to the layer 7 application information;
a buffer, configured to, when the layer 7 application information is not acquired, process the current packet, send the current packet to a second entity, and buffer the current packet, wherein the buffered packet becomes a historical packet;
a traffic distributor, configured to send the current packet to a service server corresponding to the layer 7 traffic distribution policy after the current packet matches the layer 7 traffic distribution policy;
wherein the traffic distributor is further configured to:
when the current packet does not match the layer 7 traffic distribution policy, process the current packet, send the processed current packet to the second entity, clear all historical packets, where the historical packets have been buffered before the traffic distribution device receives the current packet, and cancel the traffic distribution on a data flow to which the current packet belongs.

9. The traffic distribution device according to claim 8, wherein the processor is configured to perform deep packet inspection (DPI) processing on the current packet to acquire the layer 7 application information used for layer 7 traffic distribution.

10. The traffic distribution device according to claim 8, wherein the traffic distributor is further configured to:
when a historical packet is buffered before the current packet, send the historical packet buffered before the current packet to a service server corresponding to the layer 7 traffic distribution policy, so that the service server processes the historical packet and sends the processed historical packet to the traffic distribution device or discards the processed historical packet.

11. The traffic distribution device according to claim 8, wherein the receiver is further configured to:
receive the processed current packet returned by the service server; and
send the processed current packet to the second entity.

12. The traffic distribution device according to claim 8, wherein the receiver is further configured to:
receive the processed current packet and a processed historical packet that are returned by the service server;
send the processed current packet to the second entity; and
discard the processed historical packet.

13. The traffic distribution device according to claim 8, wherein the buffer is further configured to:
when the layer 7 application information is not acquired after deep packet inspection (DPI) processing has been performed on a preset number of continuous packets before the current packet is received, and the layer 7 application information is also not acquired after DPI processing is performed on the current packet, clear the preset number of continuous packets that are buffered, and cancel traffic distribution on a data flow to which the current packet belongs.

14. The traffic distribution device according to claim 8, wherein:
the first entity comprises a mobile phone, a computer, a notebook computer, or a WAP server;
the second entity comprises a mobile phone, a computer, a notebook computer, or a WAP server; and
the first entity and the second entity are two entities communicating through the traffic distribution device.

\* \* \* \* \*